United States Patent [19]

Cornellier

[11] Patent Number: 4,654,227
[45] Date of Patent: Mar. 31, 1987

[54] METHOD AND APPARATUS FOR DIP TINNING

[75] Inventor: Rene Cornellier, Ste. Julie, Canada

[73] Assignee: Corfin Technologies Inc., Montreal, Canada

[21] Appl. No.: 691,135

[22] Filed: Jan. 14, 1985

[30] Foreign Application Priority Data

Jan. 17, 1984 [CA] Canada .................................. 445474

[51] Int. Cl.$^4$ ............................................ B05C 13/02
[52] U.S. Cl. ..................................... 427/96; 118/423; 118/503; 198/803.1; 198/803.7
[58] Field of Search ............... 118/404, 423, 429, 503; 198/803.7, 803.1; 221/259, 260, 279; 228/44.3; 427/96

[56] References Cited

U.S. PATENT DOCUMENTS 2,918,197 12/1959 Ritscher et al. ...................... 221/277
4,425,996 1/1984 Hoffman ....................... 198/803.1 X Primary Examiner—John P. McIntosh
Attorney, Agent, or Firm—Watson, Cole, Grindle & Watson

[57] ABSTRACT

An apparatus for tinning electronic components wherein a plurality of fingers are mounted on a closed loop carrier means for carrying the components through the various steps of the process. The fingers are actuated to move into and out of a component engaging position at different work stations.

7 Claims, 7 Drawing Figures

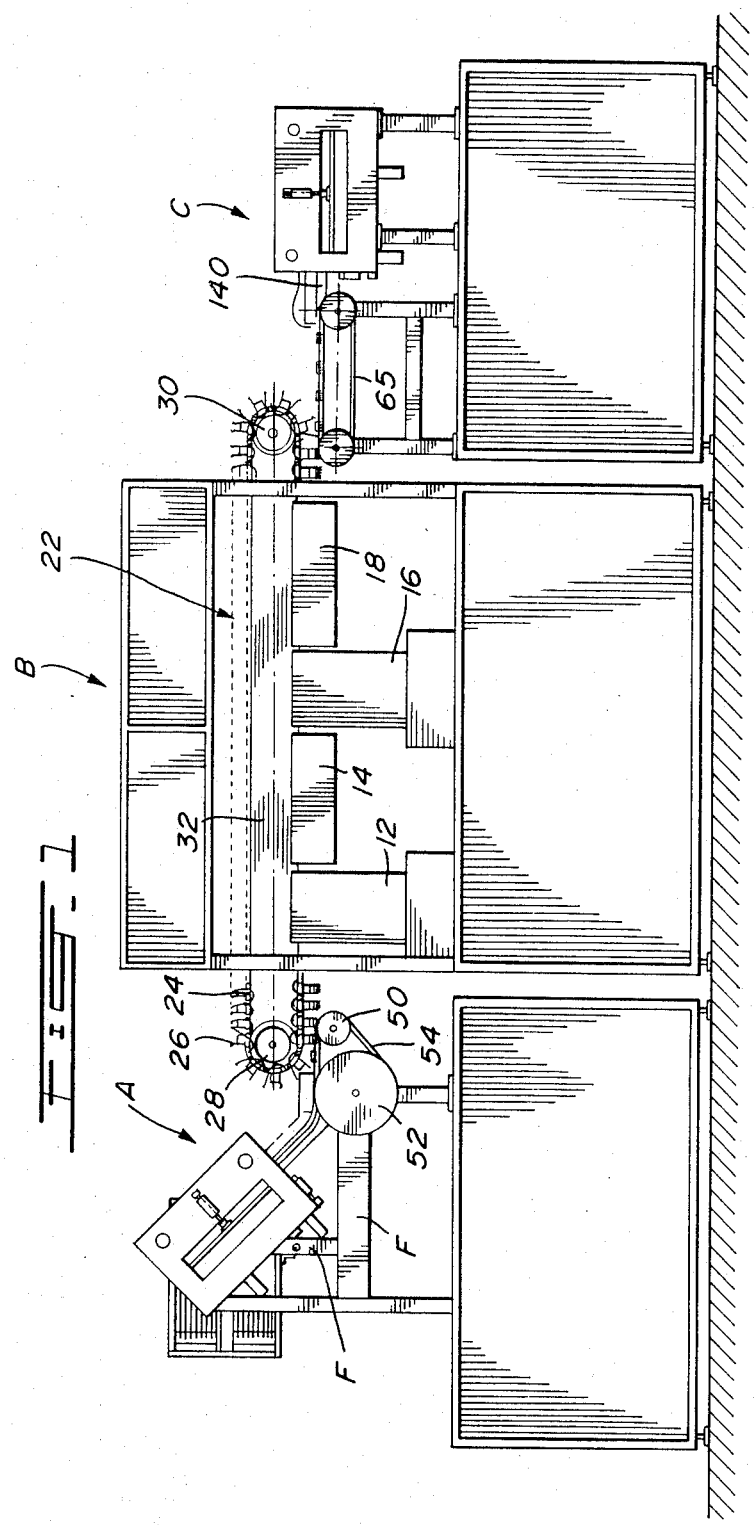

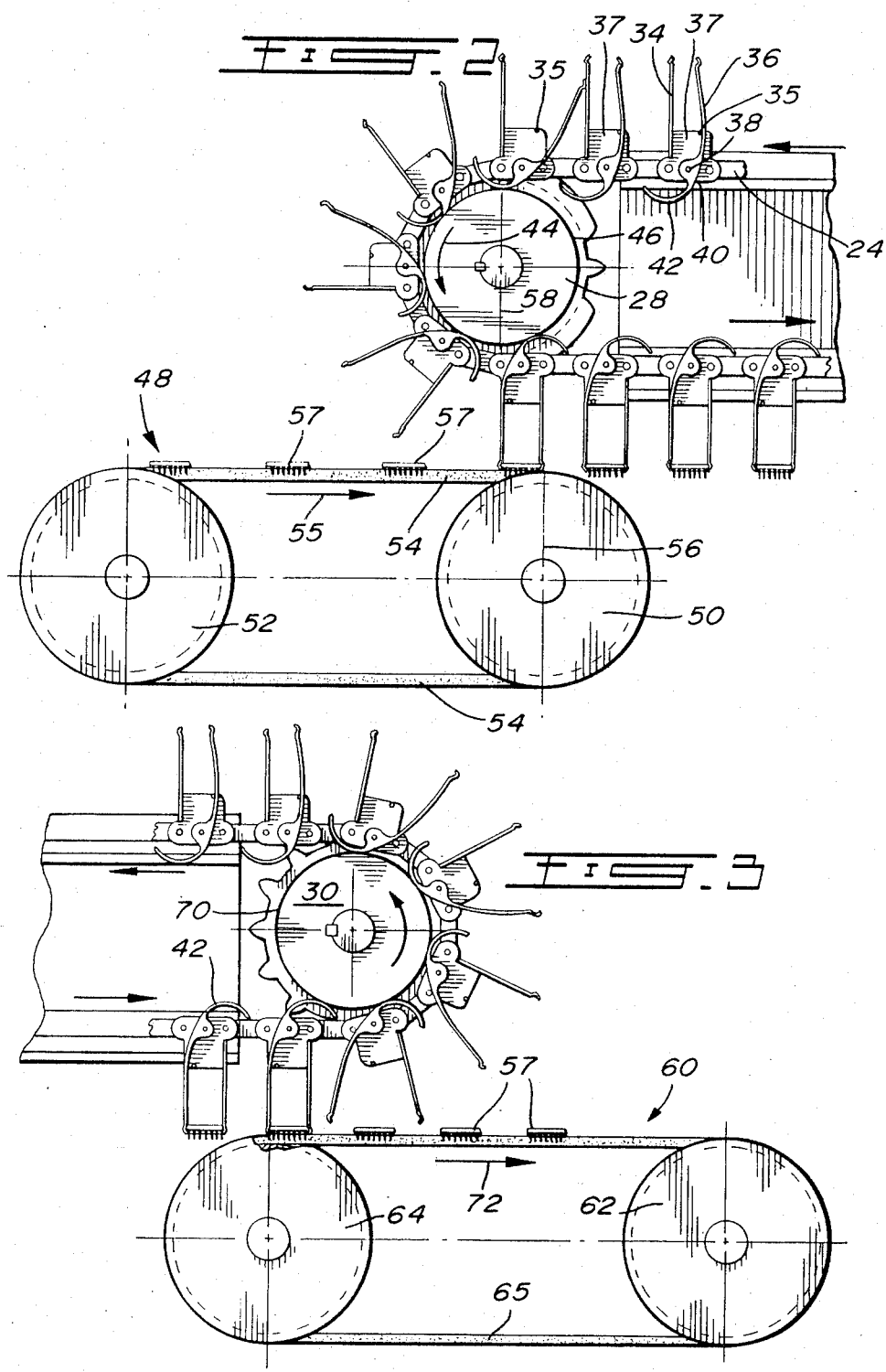

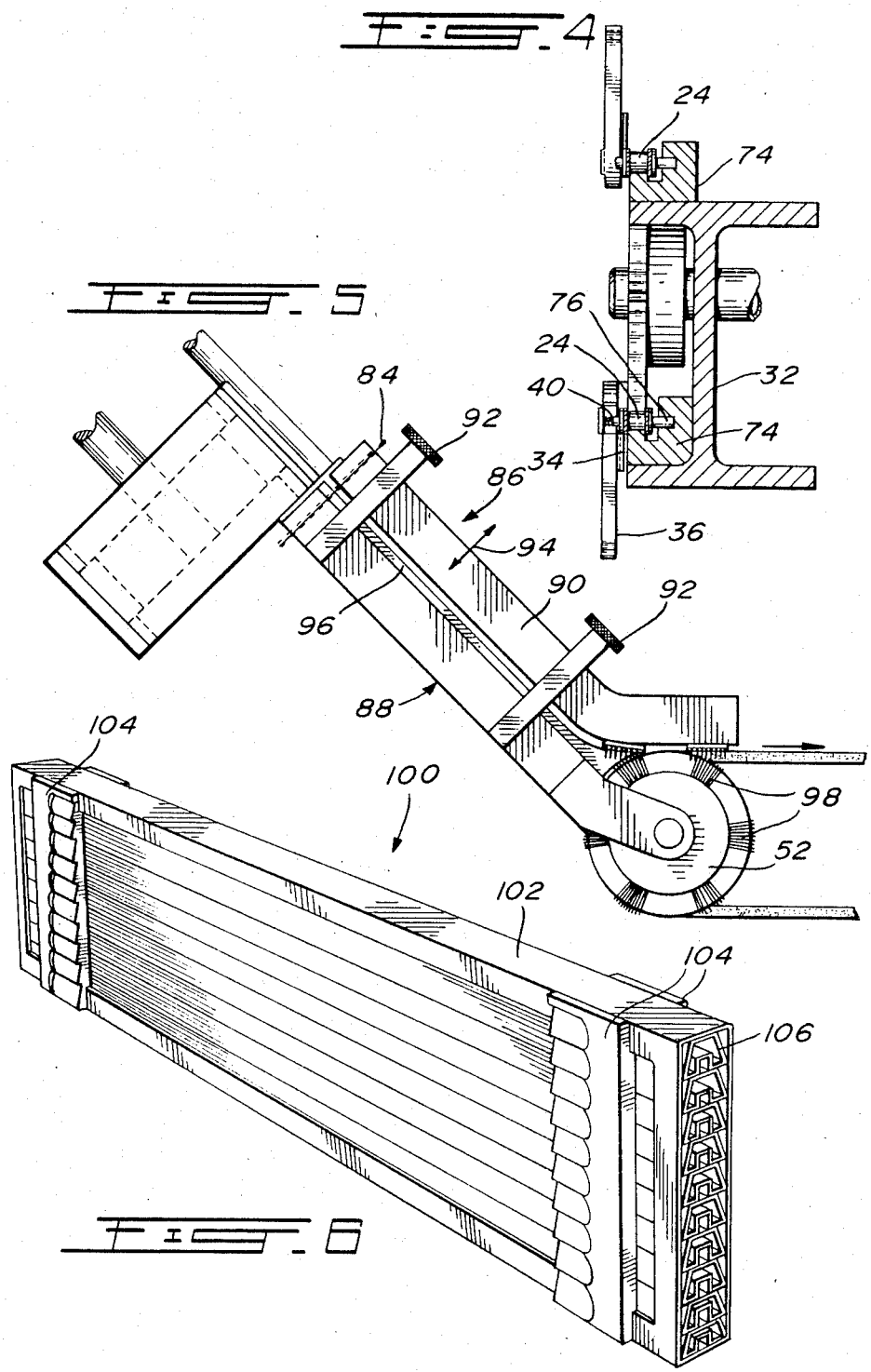

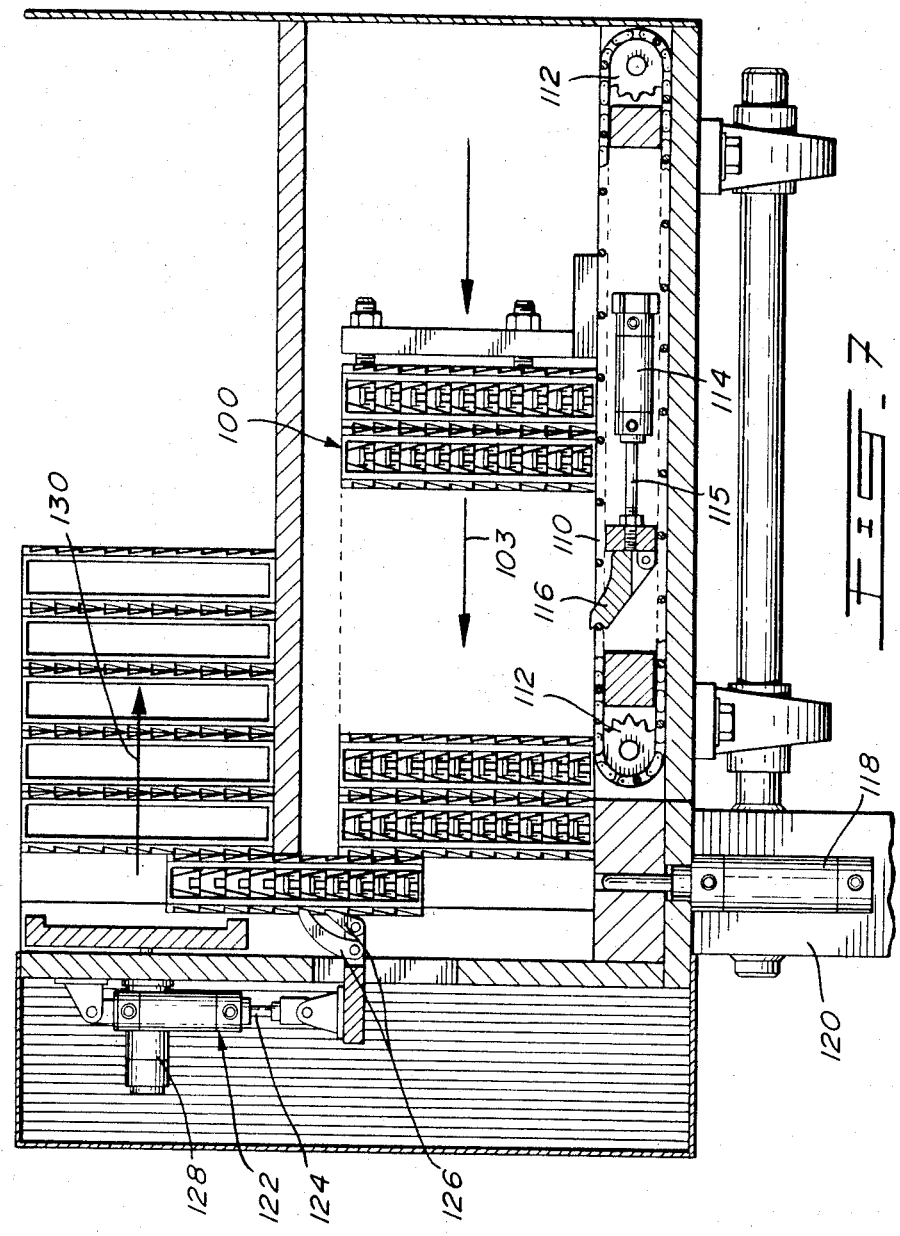

METHOD AND APPARATUS FOR DIP TINNING

The present invention relates to an apparatus and more particularly, relates to improvements in DIP tinning apparatuses.

In the electronic industry, one problem encountered with components such as DIPS (dual in-line packages) is the solderability of the metal leads when they are placed in or on the printed circuit board. A great majority of soldering defects are caused by the poor solderability of the component leads. This poor solderability is generally the result of oxidation of the metallic leads and particularly when the leads are formed of materials which form oxides not readily removed by fluxes in the soldering process. Thus, it is known in the art to "tin" the leads with a hot solder coating to thereby assure the solderability of the leads and reduce defects and rework.

Various proposals have been advanced in the art with respect to the tinning of component leads. Thus, it is known in the art to apply the solder coating to the leads prior to derailing of the DIPS. However, this results in an increased solder usage and greater expense. It has also been proposed in the art to push the leads along a channel while processing through a wave-soldering unit. However, unless properly contained, the DIPS may "float" on the wave and turn from their proper orientation on the track.

It is an object of the present invention to provide an apparatus for tinning electronic components wherein the components are carried by their body portion by gripping means which are movable into and out of open and closed positions at different work stations.

It is a further object of the present invention to provide improvements in tinning systems and in particular a loading and unloading system for transferring electronic components.

According to one aspect of the present invention, there is provided an apparatus suitable for DIP tinning, the apparatus including carrier means movable between first and second points. The carrier means have associated therewith a plurality of dip retaining means which are thus movable between the first and second points. At the first point, the dip retaining means are adapted to engage and retain a single dip by its body. The dip is then transported to the second point while being subjected to a tinning operation. At the second point, the retaining means are adapted to release the dip. Associated with the above is a loading assembly adapted to put the dips in an operative position for the retaining means to pick up and retain the same and a discharge assembly at the second point adapted to transport the dips away from the second unloading point.

In a further aspect of the invention, there is provided an apparatus suitable for transferring a component from a first station to a second station, the apparatus including an endless conveyor loop which has support means associated therewith. The endless conveyor loop is driven by suitable drive means and the conveyor loop carries a plurality of gripping means each of which comprises first and second gripping fingers. At least one of the gripping fingers is movable between open and closed positions and there are provided actuating means at the first and second stations to cause the movable finger to move between the open and closed positions to thereby engage or disengage a component which has been gripped thereby.

Still further, there is provided a loading system for feeding components to a desired position, the loading system including an accumulator slide having an inlet end and a discharge end. There is provided means for moving the components into registry with the inlet end of the accumulator whereby they will move to the discharge end, with stop means being provided at the discharge end to retain the components. The system will also include transfer means for moving an individual component from said stop means and transferring it to a moving conveyor.

In greater detail, the present invention may be utilized for transferring components and particularly, electronic components from a first work station to at least a second work station; the preferred embodiments of the invention include transporting electronic components through a tinning process which includes a plurality of steps.

The carrier means of the present invention comprise an endless or closed conveyor loop upon which are mounted the retaining or gripping means. The carrier is preferably arranged such that the components are carried in a generally horizontal direction. The endless conveyor loop will have support means and drive means associated therewith. The support and drive means may be conventional. In a "normal" embodiment, the closed loop is journalled about two support means situated at opposite ends of the loop with one or both of the support means functioning as a drive means.

The retaining or gripping means are carried by the closed conveyor loop. The gripping means are adapted to move between open and closed positions at one or more locations in order that they may pick up and/or release a component. Actuating means are provided to cause the gripping means to move into and out of the open/closed positions.

The components which the apparatus may carry may be varied. In a particular embodiment, the present invention is adapted to carry DIPS (dual in-line packages) commonly used in the electronic industry. As such, the description herein will refer to such components; it being understood that other components may likewise be carried.

In a preferred embodiment, the gripping means comprises a pair of fingers adapted to engage and retain the dip bodies such that the leads thereof may be subjected to the required tinning operations. The fingers are adapted to move into and out of the dip engaging positions—i.e. to open when they reach the pick up or loading station for the dips; to operate to keep the dips in a secure retaining position during transport through the tinning operations; and to release the dips at the unloading station. The retaining means or fingers may be suitably secured to the carrier means or chain.

In a particularly preferred embodiment, one of the fingers is a fixed member while the other finger is movable between first and second positions by action of a cam surface on a portion of a finger. The cam surface, in this embodiment, may function in conjunction with a support wheel around which the carrier chain and fingers attached thereto move when approaching the pick up station. During its movement around the support wheel, the wheel or associated portion thereof acts as a cam surface to move the movable finger into a non-retaining position and subsequently, as it passes around the wheel, the movable finger moves into a dip engaging and retaining position in conjunction with the fixed finger. A similar operation occurs in reverse at the unloading station.

The present invention may include means for feeding the dips or components into the desired operative relationship with respect to the gripping means. Thus, in the above embodiment, the means for feeding the dips would be coordinated such that the individual dips are placed into a gripping position while the movable finger is open such that it may be gripped by the two fingers. The feeding or loading system for transferring the components will also preferably include means for taking a plurality of dips or components, feeding these into an accumulator wherein they may be temporarily stored, and means for transferring the individual components into the desired relationship with the fingers.

During transport between the loading and unloading stations or assemblies, the dips are subjected to the required tinning operations. Such operations or steps are well known in the art and need not be discussed in greater detail herein.

Having thus generally described the invention, reference will be made to the accompanying drawings illustrating embodiments thereof, in which:

FIG. 1 is a front elevational view of a dip tinning apparatus including a loader and unloader assembly;

FIG. 2 is a detail view of the pick up of the components by the gripping means;

FIG. 3 is a detail view of the discharge of the components at the unloading assembly;

FIG. 4 is a sectional view through the main conveying section;

FIG. 5 is a view of the pick wheel and transfer of the components from the accumulator;

FIG. 6 is a perspective view of a cartridge storage device; and

FIG. 7 is a cross-sectional view of a portion of the loading system.

Referring to the drawings in greater detail and by reference characters thereto, the dip tinning system illustrated in FIG. 1 includes a loading assembly A, a central processing unit B and an unloading assembly C.

Central processing unit B includes, for treatment of the dips, a fluxing unit 12, a preheater section 14, a wave soldering section 16 and a cleaning section 18. These sections or components are conventional ones known to those skilled in the art and the overall system may include one or more additional components if so desired. In operation, a dip would be passed through fluxing unit 12 to have an application of flux on the leads, subsequently through preheater 14 to prevent thermal shock, through wave soldering unit 16 wherein solder is applied to the leads and subsequently through cleaning unit 18 which may include a washing and drying section.

A carrier system 22 is utilized for passing the dips through the various units and sections. Carrier system 22 includes a continuous carrier chain 24 upon which are mounted a plurality of gripping means 26 for gripping the individual dips. A pair of drive wheels 28 and 30 drive the continuous carrier chain 24; a support 32 extends between drive wheels 30 and 28.

Gripping means 26 are illustrated in greater detail in FIG. 2; as will be seen therein, they include a first fixed finger 34 mounted on continuous carrier chain 24 and a second movable finger generally designated by reference numeral 36. Finger 36 is journalled at point 38 on carrier chain 24 and is spring biased (spring member 30—see FIG. 4) to move towards finger 34. A stop member 35 forms a portion of body 37 and is adapted to limit the movement of finger 36 towards fixed finger 34. Finger 36 also includes a finger extension 42 as may be seen in FIG. 2.

Drive wheel 28, which has a vertical axis 58, rotates in the direction illustrated by arrow 44 and includes a cam surface 46 adapted to engage finger extension 42. Thus, as may be seen in FIG. 2, upon engagement of curved finger extension 42 with cam surface 46, finger 36 is caused to "open" or move outwardly from finger 34 and is kept in this position during its movement around drive wheel 28.

The system includes a loading assembly generally designated by reference number 48. Loading assembly 48 includes a first wheel 50 having vertical axis 56 and a second wheel 52 about which extends a belt 54 driven in the direction indicated by arrow 55. A plurality of dips 57 are deposited on belt 54 in a spaced apart arrangement as will be discussed hereinbelow.

Turning to FIG. 3, there is illustrated an unloading or discharge assembly generally designated by reference numeral 60. Discharge assembly 60 includes a first wheel 62 and second wheel 64 with belt 65 extending thereabout, belt 65 being adapted to receive dips 57 upon discharge. In a manner similar to wheel 28, wheel 30 includes a cam surface 70 adapted to engage finger extension 42 to cause finger 36 to open and deposit dips 57 on movable belt 65 moving in the direction of arrow 72.

The loading and unloading systems are preferably directly tied into the overall system and in particular, the drive means for loading assembly 48 and unloading assembly 60 are preferably taken from the same drive means as utilized for drive wheel 28. Thus, when dips 57 are deposited on belt 54 in a predetermined spaced apart manner, loading system 48 is preferably driven at the same speed as carrier system 22. Loading system 48 is arranged such that the vertical axis 56 of wheel 50 and the vertical axis 58 of drive wheel 28 are separated a horizontal distance equal to the width of the dip to be carried. It will also be noted that the system is arranged such that movable finger 36 grasps dip 57 at a point corresponding to the alignment of vertical axis 58. The unloading or discharge assembly is arranged such that when finger extension 42 first contacts cam surface 70 of wheel 30, belt 65 is adapted to receive the dips.

As shown in FIG. 1, wheel 52 is preferably sized to have a diameter substantially larger than that of wheel 50. For ease of illustration, this is not shown in FIG. 2. Wheel 52 also has a diameter larger than that of drive wheel 28 and preferably they are driven in a 1:1 ratio. Accordingly, wheel 52 will have a greater peripheral speed (as will belt 54) than chain 26. As such, this will function to actually permit dips 57 to be brought into contact with fixed finger 34 whereat it may be gripped in conjunction with movable finger 36.

As shown in FIG. 4, carrier chain 24 includes a pin member 76 which is journalled in a slot in chain guide 74. Chain guide 74 is preferably formed of a suitable heat resistant material having a wear surface thereon. As may be seen from FIG. 4, chain guide 74 functions to keep fingers 34 and 36 in alignment to prevent any "play" therein.

A particular feeding system is illustrated in FIG. 5 and will now be referred to. In the system of FIG. 5, there is provided an accumulator generally referred to by reference numeral 86. Accumulator 86 is composed of a bottom portion 88 which, as may be seen in FIG. 5, is hingedly connected with respect to wheel 52. A top member 90 is adjustable with respect to base 88 through members 92 such that it can move in the directions indicated by arrow 94.

Loading assembly A (to be described in greater detail hereinbelow) feeds the dips into accumulator 86 wherein they slide on bottom portion 88. Bottom portion 88 has a stop member (not shown) to retain the dips at the bottom of the slide and to prevent the dips from going any further.

In the illustrated embodiment, wheel 52 includes a plurality of brushes 98 mounted thereon which are adapted to engage the leads of the dips, slightly lift the dips over the stop means, and transfer them to the belt 54. Accumulator 86 preferably includes a photocell 84 to detect when slide 96 is empty and to feed a signal to the loading assembly as will be discussed below.

With respect to brushes 98 or any equivalent thereof, it is preferred that the same number of brush sets be mounted about the circumference of the wheel as there are fingers mounted about wheel 28. Thus, once initial timing of the system is achieved, the delivery system will deliver exactly the same number of dips as there are fingers about the wheel 28.

As will be noted from FIG. 5, feed slot 96 is at an angle with respect to wheel 52 and the angle can be adjusted for operational purposes as will become clear hereinafter. Means are provided for removing the individual dips from the feed slot 96 of accumulator 86 and to this end, there may be provided a material such as a plurality of hairs 98 either on a portion of wheel 52 or on a belt 54 entrained thereabout. Hairs 98 are adapted to grab the leads of the lowermost dip and the system is co-ordinated to place them in the desired relationship with the fingers. A similar discharge system may be provided at the other end preceding the dip back into a package such as plastic tubes 82.

Referring to FIG. 6, a typical cartridge as may be utilized in the loading/unloading assembly of the present invention is illustrated. Cartridge 100 has a rectangular frame member 102 and mounted on each side are members 104 for indexing purposes as will be discussed in greater detail hereinbelow. Mounted interiorly of frame 102 are a plurality of generally U-shaped plastic tubes 106 which constitute the storage device for the dips. Use of tubes 106 is standard in the industry for dips. Each tube 106 is preferably supported in the desired position by retaining means (not shown) interiorly of frame member 102.

The unloading assembly, as shown in FIG. 7, has upper and lower tracks upon which cartridges 100 will move. Referring initially to the lower track, there is provided a chain member 110 journalled about support wheels 112. A pair of chains 110 may be provided at either end of cartridges 100. The first cylinder 114 having piston 115 with pawl 116 mounted thereon is adapted to engage a portion of chain 110. Thus, upon receiving a suitable signal, cylinder 114 is activated to drive chain 110 for a suitable distance to remove another cartridge into a desired position. Piston 115 is then retracted and placed in position to again drive chain 110.

A second cylinder 118 mounted in a fixed support 120 is adapted to move a cartridge upwardly for a short distance whereupon a third cylinder generally designated by reference numeral 122 having piston 124 and associated pawls 126 are adapted to engage members 104 on the cartridge sides to move the cartridge up a desired distance. In operation, each plastic tube 106 in cartridge 100 is brought into alignment with the inlet on the accumulator such that the dips in the tube may be discharged. Subsequent to discharge, a suitable signal is given and cartridge 100 is moved up to bring a further tube into alignment.

Following emptying of all the tubes in cartridge 100, a further cylinder 128 is activated to move the then empty tubes and cartridge in the direction shown by arrow 130.

Thus, as may be seen from the above, full cartridges may be placed on the lower level whereupon they are indexed into position as shown by arrow 103 by cylinder 114. Each cartridge is, in turn, indexed upwardly (initially by cylinder 118 and subsequently by cylinder 122) to discharge its contents into the accumulator. The empty cartridges are then indexed horizontally by cylinder 128 as indicated by arrow 130.

Referring back to FIG. 1, the cartridge loading section may be pivotably mounted on frame members F such that it may be moved to the horizontal position for loading and subsequently pivoted to the angled position of the balance of the loading assembly.

Unloading assembly C operates in substantially identical manner to the loading assembly. Thus, upon the dips being discharged onto belt 65, they may be transferred via means on wheel 62 to a slide 140 (FIG. 1) in alignment with the tubes in the cartridges of unloading assembly C. The cartridges in unloading assembly C would be indexed in a manner similar to that shown in FIG. 7. A photocell may be utilized in conjunction with a counter to tell when the tubes are filled and to give the necessary signal for indexing.

It will be understood that changes and modifications may be made to the above-described embodiments without departing from the spirit and scope of the invention.

I claim:

1. An apparatus suitable for applying a coating to electronic components comprising a loading section, a processing section, and an unloading section;
   (1) said processing section comprising an endless loop conveyor having a plurality of retaining devices associated therewith, each retaining device adapted to hold and retain a single component and pass said component through a plurality of process work stations;
   (2) said loading section comprising an accumulator adapted to receive a plurality of components, a transfer belt extending between said endless conveyor and said accumulator, drive means adapted to drive said transfer belt to have a greater linear speed than the linear speed of said conveyor, singulating means for taking individual components from said accumulator at predetermined intervals and placing said individual components in a spaced relationship on said transfer belt whereafter said components are moved by said transfer belt into a position where they are held and retained by said retaining devices;
   (3) said unloading section comprising means for receiving components discharged from said conveyor after said components have passed through said process work stations.

2. The apparatus of claim 1 wherein each of said retaining devices comprises a pair of fingers, said fingers normally being urged together so as to grip and retain a component therebetween, one of said fingers being movable between an open non-gripping position and a closed position when adjacent said movable finger moving to an open position when adjacent said transfer belt to permit said individual component placed on said transfer belt to move into engagement with the fixed finger due to the greater linear speed of said transfer belt.

3. The apparatus of claim 2 wherein said electronic components are DIPS, said accumulator comprising a slide member adapted to receive a plurality of DIPS in an end-to-end relationship, said singulating means for taking individual components from said accumulator comprising a wheel about which said transfer belt is entrained having means thereon to advance individual DIPS from said accumulator to said transfer belt.

4. The apparatus of claim 3 wherein said means for advancing individual DIPS comprises a plurality of brushes adapted to engage the legs of a DIP and place said DIP on said transfer belt in a position whereby the DIP is supported on the underside of its body by said belt.

5. The apparatus of claim 3 wherein said endless loop conveyor includes first and second support wheels about which said conveyor is entrained, at least one of said support wheels being a driven wheel, said drive means for driving said transfer belt also driving said driven wheel of said conveyor, said singulating means comprising a plurality of brush means about said wheel, the number of brush means equalling the number of retaining means which would extend about said driven support wheel of said endless loop conveyor.

6. In an apparatus for applying a hot solder coating to DIPS, and which apparatus includes an endless loop conveyor having a plurality of retaining devices mounted thereon, each of the retaining devices comprising a pair of fingers adapted to grip an individual DIP therebetween, a first loading station at which said fingers are moved to an open non-gripping position following which said fingers are urged to a closed gripping position, and a second unloading station at which the fingers are again moved to an open non-gripping position to release the DIP, the improvement comprising an accumulator adapted to receive a plurality of DIPS in an end-to-end relationship, a transfer belt extending between said accumulator and said loading station, said transfer belt being driven at a greater linear speed than the linear speed of the endless loop conveyor, said transfer belt being entrained about a wheel, said wheel having means associated therewith for taking single DIPS from said accumulator and placing said single DIPS on the transfer belt in a spaced relationship, said transfer belt being aligned with the loading station such that when the fingers are moved to an open position, said transfer belt will bring individual DIPS thereon into engagement with one of said fingers to be gripped by the fingers when said fingers are moved to a closed gripping position.

7. In a method for applying a solder coating to the leads of electronic components, wherein the individual components are gripped by retaining means comprising a pair of fingers mounted on an endless loop conveyor whereby the components are passed through a plurality of process work stations, the improvement comprising the steps of
  (1) placing the components on a slide accumulator;
  (2) aligning a driven transfer belt between a discharge end of said slide accumulator and a loading station of said conveyor;
  (3) individually removing components from the discharge end of the slide accumulator and placing the components on the transfer belt in a spaced relationship;
  (4) causing said fingers to open at the loading station;
  (5) driving said transfer belt at a greater linear speed than the linear speed of the endless loop conveyor to thereby cause the component to be brought into engagement with a first finger whereby the component can be gripped when the fingers are moved to a gripping position.

* * * * *